United States Patent [19]

Dana et al.

[11] Patent Number: 4,808,478

[45] Date of Patent: Feb. 28, 1989

[54] CHEMICALLY TREATED GLASS FIBERS FOR REINFORCING THERMOSETTING POLYMERS

[75] Inventors: David E. Dana, Pittsburgh, Pa.; Richard A. Davis, Shelby, N.C.; Howard J. Hudson, Whitaker; Steven J. Morris, Freeport, both of Pa.

[73] Assignee: PPG Industries, Inc., Pittsburgh, Pa.

[21] Appl. No.: 904,728

[22] Filed: Sep. 5, 1986

[51] Int. Cl.$^4$ ............................ D02G 3/00; B32B 9/00

[52] U.S. Cl. ..................... 428/391; 428/375; 428/378; 428/392; 65/3.41; 65/3.44; 65/3.43

[58] Field of Search .............. 428/373, 375, 378, 391, 428/392, 428, 429; 65/3.41, 3.44, 3.43

[56] References Cited

U.S. PATENT DOCUMENTS

| | | | |
|---|---|---|---|
| 3,597,265 | 8/1971 | Mecklenborg et al. | 428/391 |
| 3,923,708 | 12/1975 | Furukawa et al. | 428/378 |
| 3,969,299 | 7/1976 | Burns et al. | 428/268 |
| 4,029,623 | 6/1977 | Maaghul | 260/29.6 RW |
| 4,305,742 | 12/1981 | Barch et al. | 428/288 |
| 4,309,326 | 1/1982 | Sage et al. | 428/392 |
| 4,330,444 | 5/1982 | Pollman | 428/378 |
| 4,338,234 | 7/1982 | Moore et al. | 428/391 |
| 4,390,647 | 6/1983 | Girgis | 65/3.44 |
| 4,394,418 | 7/1983 | Temple | 428/391 |
| 4,435,474 | 3/1984 | Das et al. | 428/391 |
| 4,436,848 | 3/1984 | Haines et al. | 428/378 |
| 4,448,910 | 5/1984 | Haines et al. | 428/378 |
| 4,448,911 | 5/1984 | Haines et al. | 428/378 |

FOREIGN PATENT DOCUMENTS

| | | |
|---|---|---|
| 1321847 | 2/1963 | France . |
| 55-3313 | 1/1980 | Japan . |
| 55-126552 | 9/1980 | Japan . |
| 1590409 | 6/1981 | United Kingdom . |

OTHER PUBLICATIONS

Technical Brochure "Polyoxy Water-Soluble Resins Are Unique", Union Carbide Corporation.
Technical Leaflet Savid pp. 14–22 and 41.

*Primary Examiner*—Sharon A. Gibson
*Attorney, Agent, or Firm*—Kenneth J. Stachel

[57] ABSTRACT

Chemically treated glass fiber reinforcement for thermosetting polymers having a moisture reduced residue of an aqueous chemical treating composition consisting essentially of a vinyl acetate-organosilane copolymer, a vinyl silane coupling agent, an amino-organo silane coupling agent, at least one cationic lubricant, polyoxyethylene, an antistatic agent, an aqueous dispersible or emulsifiable wax with a surfactant and water.

13 Claims, No Drawings

CHEMICALLY TREATED GLASS FIBERS FOR REINFORCING THERMOSETTING POLYMERS

The present invention relates to chemically treated (sized) glass fiber reinforcement for thermosetting polymers like sheet molding compound (smc).

In producing reinforced thermosetting polymeric materials, the reinforcement found most acceptable for general use by the industry is glass fiber reinforcement in the form of chopped strands, continuous strands, chopped strand mat, continuous strand mat and the like. The glass fibers are produced from molten streams of glass issuing forth from small orifices in a bushing containing molten glass. The glass fibers cool and solidify and are treated with a chemical treatment to arrest interfilament abrasion and to provide compatibility between the inorganic glass and the organic polymeric matrices. At this point, the glass fibers can be chopped, gathered into one or more strands for collection or for chopping. Collected continuous strand or strands on a forming package can be produced into roving by mounting a plurality of the glass fiber forming packages on a creel or support and gathering the strands from the separate packages in parallel to form a rope or roving. This braided rope or roving is wound on a rotating drum to collect the roving. Roving is further processed by chopping, has a plurality of uses depositing to form a continuous strand mat, weaving to form woven roving or using it by merely unwinding and impregnating it with resin. Chopping of the roving products produces chopped strand which has found utility in the area of glass fiber reinforced thermosetting molding compounds. In one area of this utility, the glass fibers which have been chopped are dispersed throughout the thickened, polymerizable polyester resinous material. This thickened resinous material with the glass fibers dispersed therethrough has a substantial viscosity in order that it may be handled by conventional techniques for producing molding compounds.

An example of the preparation of such molding compounds is the preparation of smc. This occurs by placing a film of polymer, usually unsaturated polyester or vinyl ester resin premix having such additives as catalysts, pigments, extenders and the thickeners on a sheet with a non-adhering surface. The film on the sheet has a uniform thickness and both travel on a conveyor belt to have chopped glass fiber roving uniformly deposited onto the polymer film. A second nonadhering sheet having a second polymer premix film is overlaid onto the first sheet so the second film contacts the first premix film with the glass fibers thereon. The sandwiched material is kneaded with a plurality of rollers having various configurations to uniformly distribute the glass fibers throughout the polymer premix. The sandwich is then taken up on a roll and can be used in subsequent molding operations. Typically, the glass fiber content in the sheet molding compound is anywhere between 25 and 45 weight percent of the compound.

The glass fibers used to reinforce thermosetting polymeric matrices must fulfill processing requirements for the glass fibers and product requirements for the glass fiber reinforced polymeric materials where some of these requirements may approach mutual incapability. For instance, glass fiber roving must have integrity in order to tolerate the processing necessary in forming the roving and in subsequent unwinding and chopping of the roving. Also when the strands are gathered in parallel to form the roving, it is desirable that they adhere to each other to form a uniform rope. However, this adhesion between the strands in the roving should not be too great because unwinding of the roving and passage of the roving through the chopping apparatus will be difficult if too much tack is imparted to the strand and the roving formed therefrom. Also the strands within the roving must dissociate one from the other during the chopping of the roving so that they may uniformly disperse throughout the molding premix. In processing the reinforced polymeric material, the glass fibers must have adequate wet-out and wet-through in the polymeric matrix. The wet-out is one measure of contact between the glass fibers and the polymeric matrix material directed to the flowability of the polymeric matrix material through the glass fiber strand mass to obtain near complete encapsulation of the entire surface of each glass fiber strand in the compound so that wet-out during compounding is a measure of the apparent intimacy of contact between the polymeric matrix and the glass fiber strand. If the glass fibers are not immediately wet-out, following compounding with the polymeric material, it may be expected that they will wet-out on aging due to the increase in viscosity of the compound. If the glass fibers wet-out too quickly or to too high a degree in the polymeric matrix, the strands may filamentize to too high a degree and produce entanglements and fuzzing in the matrix. Both of the latter situations may lead to adverse affects in the processability, molding characteristics and surface properties of the final molded polymeric material. Another measure of the proper contact is referred to as "wet-through" or "follow-through". This refers to the speed with which the matrix polymer can penetrate into the massive glass fiber strands in compounding the molding compound. It is desired to have a high degree of wet-through and molding compounds like smc in order that the final physical properties of the molded composites and the processability thereof are at their maximum levels.

The production of uniform, low ripple and smooth surfaced molded composites of fiber reinforced thermosetting polymers is influenced by the solubility of the sizing composition on the glass fibers. If the sized glass fibers have a moisture-reduced sizing residue that is substantially insoluble in the matrix polymer, the majority of sized glass fiber strands remain intact rather than filamentizing into their component fibers. As previously mentioned, this integrity is desirable while the strand encounters the multitude of forces and conditions experienced during preparing molding compound to guard against filamentizing with resultant formation of fuzz balls with the loss of smooth surface characteristics in the molded composite. But at some point in time in the processing of the molding compounds, the sized glass fiber strands should filamentize to become uniformly dispersed throughout the polymeric matrix.

It is an object of the present invention to provide sized glass fiber strands and rovings therefrom useful in producing fiber reinforced thermosetting polymeric materials, where the fiberous reinforcement has balanced properties of wet-out and wet-through and integrity of the strands for processability.

It is a further object of the present invention to provide chemically treated glass fibers useful as reinforcement for thermosetting polymeric matrices, where the chemically treated fibers are less sensitive to thermal conditioning therefore being less susceptible to color changes due to thermal processing.

SUMMARY OF THE INVENTION

The aforementioned objects and other objects gleaned from the following disclosure are accomplished by the present invention. The present invention involves chemically treated glass fibers having a moisture-reduced residue of an aqueous chemical treating composition. The aqueous chemical treating composition has a vinyl acetate-organo silane copolymer having up to about 1 weight percent of the organo silane in an effective sole film-forming polymeric amount for the chemically treated glass fibers to provide a precured polymeric film forming material for the glass fibers. Also present are: a vinyl silane coupling agent and an amino-organo silane coupling agent in an effective coupling agent amount, and at least one cationic lubricant in an effective lubricating amount, and an antistatic agent in an effective antistatic amount, and an aqueous dispersible or emulsifiable wax with a suitable surfactant in an effective dry lubricating amount and polyoxyethylene in an effective molecular weight and amount to function as a binder water in an effective amount to permit the application of the aqueous chemical treating composition to the glass fibers during the formation of the glass fibers. The aqueous chemical treating composition is applied to the glass fibers in an effective amount to provide on the glass fibers an amount of moisture-reduced residue of the aqueous chemical treating composition in a specific range. Once treated with the aqueous chemical treating composition, the glass fibers are subsequently heated to reduce the moisture content of the glass fibers to less than around 0.1 weight percent and to provide a residue in the range from 2.2 to 3 weight percent of the glass fibers. Additional materials that may be present in the aqueous chemical treating composition include an aldehyde condensation polymer, which, if present is in an amount less than the amount of the film forming polymer. The film-forming polymer is the predominant constituent of the nonaqueous portions of the aqueous chemical treating composition.

The chemically treated glass fibers with the aforementioned chemical treatment can be used alone in reinforcing polymeric matrices or can be blended with different chemically treated glass fibers so that the blend is used in reinforcing polymeric matrices.

The different chemically treated glass fibers are glass fibers having: a moisture-reduced residue of an aqueous chemical treating composition having a major amount of the solids being one or more cross-linkable film forming polymers compatible with the polymeric matrix; one or more organo silane coupling agents in an amount up to 20 weight percent of the solids; an epoxidized polar thermoplastic copolymer selected from the group consisting of epoxidized polyvinyl acetate, epoxidized polyacrylate, epoxidized urethane, and epoxidized polyamides, all of which are thermoplastic and have epoxy functionality in an amount of about 3 to about 12 parts per 100 parts of the copolymer in an amount of about 10 to about 50 weight percent of the nonaqueous solids of the sizing composition where the copolymer has a glass transition temperature from ambient to about 70° C.; and an aldehyde condensate polymer in an amount of about 2 to about 14 weight percent of the nonaqueous solids of the aqueous composition; and water sufficient to make the percent solids of the sizing composition in the range of about 2 to about 30 weight percent. The blend of the chemically treated glass fibers can be in any ratio from about 1 to 99 to about 99 to 1.

DETAILED DESCRIPTION AND PREFERRED EMBODIMENT OF THE INVENTION

Some commercially available sized glass fibers for reinforcing thermosetting polymeric matrices like smc have a darker color than others. We have found that by having present in the aqueous chemical treating composition a sole film-forming polymeric material that has no unsaturation in the backbone of the polymer that the subsequent moisture reduction step in producing the chemically treated glass fibers has less of an effect on color formation of the glass fibers. Also when unsaturation is present in a polymeric film forming material on the chemically treated glass fibers, careful curing is necessary to avoid the treated glass fibers wetting through too quickly in the resin matrix. Nonuniform curing can lead to the formation of filamentary entanglements and fuzzing that are detrimental to the surface of any molded part. We have found that by having the sole film forming polymeric material on the chemically treated glass fiber already having crosslinking before application to the glass provides for more consistent solubility in matrix resins without dependence upon careful curing during the moisture reduction step. Also we have found that chemically treated glass fibers not having a film-forming polymeric material with unsaturation in its backbone should have higher amounts of the moisture-reduced residue on the glass fibers. In addition, we have found that although the chemically treated glass fibers of the present invention are suitable for thermosetting polymeric matrices, ideal molding conditions of reinforced thermosets are more suitably met when there is a blend of chemically treated glass fibers. The blend enables the production of more suitable sheet loft for the moldable reinforced thermosetting polymeric material.

The chemically treated glass fibers of the present invention involve the use of any fiberizable glass fiber composition manufactured by any known method for producing glass fibers. Preferably, the glass fibers are those of a "E-glass" or "621-glass" composition or any environmentally acceptable derivative thereof. Preferably the method of forming the glass fibers involves directly melting glass batch in a furnace and mechanically attenuating glass fibers from orifices in a bushing containing molten glass. The filament diameters of the glass fibers can be any filament diameter for continuous glass fibers, for instance, from less than 5 micrometers to around 30 micrometers or more, and any number of filaments may be combined to produce multifilament strands. During the formation of the glass fibers, the aqueous chemical treating composition is applied to them and the filaments are preferably wound as continuous strands into a forming package.

The aqueous chemical treating composition of the present invention has the pre-cross-linked sole film forming polymeric material in a predominant amount of the solids of the aqueous chemical treating composition. This polymer is a vinyl acetate-organo silane copolymer having up to about 1 weight percent of the copolymer as the organo silane. Preferably, the amount of organo silane in the copolymer is around 0.25 weight percent of the copolymer. Larger amounts may be used but without providing any additional advantages. A suitable copolymer is that which is available from National Starch and Chemical Corporation, Bridgewater, N.J., 08807, under the trade designation Resyn 1037 copolymer emulsion. This copolymer is in the form of a precured microgel emulsion, where the copolymer is of vinyl acetate and gamma-methacryloxypropyl trimethoxy silane and has about 0.25 weight percent of the copolymer as the organo silane. The aqueous emulsion of this copolymer has a solid content of about 55 percent, a pH of 4.7 and an average particle size of around 1 micron and a viscosity measured according to RVF Brookfield No. 2 spindle at 20 rpms at 72° F. (22° C.) of 1225 centipoise and a mechanical stability in a Hamilton Beach mixer at 15 minutes of 10,000 rpm. The effective sole film forming amount of the copolymer is a predominant amount of the nonaqueous components of the sizing composition and preferably in an amount of about 75 to about 95 weight percent of the nonaqueous components of the aqueous sizing composition.

In addition to the copolymer, the aqueous chemical treating composition has at least two organo functional silane coupling agents. One silane coupler that is present is a gamma-methacryloxyalkyl trialkoxy silane, a suitable example is that available from Union Carbide Corporation under the trade designation A-174. The second organo silane coupling agent present in combination with the first organo silane coupling agent is an amino functional organo silane coupling agent. A suitable example is that available from Union Carbide Corporation under the trade designation A-1100 which is a gamma aminopropyltriethoxy silane. An effective coupling agent amount of the organo silane coupling agents is in the range of 0.1 to 2 weight percent of the aqueous chemical treating composition and from about 1 to about 20 weight percent of the nonaqueous components of the aqueous chemical treating composition. Preferably the methacryloxy-containing silane coupling agent is used in a predominant amount compared to the amino-organo silane coupler. The relative amounts of these coupling agents are 2 to 4 weight percent of the solids of the size for the methacryloxy-containing coupler and at least 0.5 weight percent solids of the amino-organo silane coupler.

Also the aqueous chemical treating composition has a cationic lubricant present in an effective lubricating amount. The cationic lubricant can be an amine salt or fatty acid that has 4 to 26 carbon atoms and an even number of carbon atoms per molecule. Fatty acid moiety of the salt can have preferably between about 12 at about 22 carbon atoms. The amines useful for forming the salt are tertiary amines at a substantially low molecular weight, i.e., the alkyl groups attached to the nitrogen atom should have between 1 and 6 carbon atoms. Also a solubilized fatty acid amide including both saturated and unsaturated fatty acid amides where the acid group contains from 4 to 24 carbon atoms can be employed. Also utilizable are the anhydrous acid solubilized polymers of low molecular weight unsaturated fatty acid amides. A particularly effective cationic lubricant suitable for use in the present invention is a pelargonic acid amide of tetraethylene pentamine sold by Imperial Chemical Industries under the trade designation Cirrasol 185-A which is a viscous liquid having a pH at 25° C. for a 2% solution of 8.5 to 9.5 and a total acidity of 12 to 14 percent. The effective lubricating amount is generally in the range of about 0.5 to about 5 weight percent of the total solids of the aqueous chemical treating composition. This amount of the cationic lubricant assists in reducing generation of fuzz during the processing of the glass fibers and production into fiber reinforced thermoset polymeric articles.

Also present in the aqueous chemical treating composition is a wax emulsion which functions as dry lubricant and is present in an effective dry lubricating amount. The wax is preferably a paraffin wax with a nonionic, ethoxylated nonyl phenol surfactant to render the wax dispersible at room temperature. A suitable commercially available wax emulsion is that available from Michelman Chemical, Inc., Cincinnati, Ohio under the trade designation Michlenlube 723 emulsion. The effective amount is in the range of about 0.5 to about 4 weight percent of the total solids of the size.

Also present in the aqueous chemical treating composition is an antistatic agent which can be any antistat known to those skilled in the art including both organic and inorganic antistats. Preferably, the antistatic material is an inorganic antistat such as ammonium chloride which is present in an effective antistatic amount ranging from about 0.5 to about 5 weight percent of the total solids (nonaqueous portions of the size). Lower amounts of the antistat cause static while higher amounts of the antistat causes coloring of the product and inhibition of curing of the matrix polymer.

Also present in the size is a suitable polyoxyethylene (POE) polymer to function as a friction reducing agent for binder lubricity. Such a poloxyethylene is available under the trade designation WSR-301 having a molecular weight of around 4 million or more. This POE is present in an amount in the range of about 0.05 to about 0.4 weight percent of the total solids of the size. Use of higher amounts leads to more viscous treating compositions. The POE can be dispersed or emulsified in water by any method known to those skilled in the art.

In addition, it is preferred, although not necessary, to have present an aldehyde condensate resin to assist in providing adequate wet-out and wet-through values for the chemically treated glass fibers in the polymeric resin matrix. Suitable aldehyde condensates are melamine formaldehyde, urea formaldehyde, phenol formaldehyde, resorcinol formaldehyde, and the like. It is preferred to have present a melamine formaldehyde in an amount ranging from 0 to about 5 weight percent of the total solids. A suitable melamine formaldehyde is that available from Monsanto Chemical Company under the trade designation Resimene 841 material.

The aqueous chemical treating composition has an amount of water to produce an aqueous composition having a proper viscosity and solids level for application of the composition to glass fibers during their formation. The total solids (nonaqueous components) of the aqueous chemical treating composition is about 1 to about 30 weight percent and preferably about 5 to 15 weight percent. In all events, the amounts of the solids in the aqueous chemical treating composition should not exceed that amount which will cause the viscosity of the solution to be greater than about 100 centipoise at 20° C. Solutions having viscosities of greater than 100 centipoise at this temperature are very difficult to apply to glass fibers during their formation without breaking the fibers. It is preferred that the viscosity of the size be between about 1 and 20 centipoise at 20° C. for best results.

The aqueous chemical treating composition can be prepared adding any of the components simultaneously or sequentially to each other with a medium degree of agitation. The prepared aqueous chemical treating composition can be applied to glass fibers in such a manner to result in a moisture-reduced residue of the chemical treating composition in the range of 2.2 to about 3 weight percent based on the total weight of the fibers with the sizing composition. The aqueous sizing composition is applied to the glass fibers during conventional forming processes to produce the sized glass fiber strands at attenuation speeds to accommodate the addition of the proper amount of the aqueous chemical treating composition. A sizing composition is applied to the glass fibers prior to the time they are gathered together to form one or more strands by means of an applicator known in the art to permit contact of a liquid with solid object such as a roller applicator or belt applicator, partially submerged in the sizing composition contained in a reservoir such as the applicator shown in U.S. Pat. No. 2,728,972 which is hereby incorporated by reference. The fibers are gathered into one or more strands by a gathering shoe and wound onto a forming package rotating at a sufficient speed to attenuate the fibers from the orifices in the bushing of a glass fiber batch melting furnace and for addition of the proper amount of the sizing composition to the glass fibers. Other methods of applying the sizing composition to the fibers such as pad applicators may be employed. The amount of the moisture-reduced residue is based on the measurement by the loss on ignition method.

The continuous glass fiber strands on forming packages are heated to reduce the moisture content of the strands by air drying or in any conventional drying ovens known to those skilled in the art at temperatures around 110° C. to 150° C. preferably 115° to 130° C. for around 11 hours. Although any time and temperature equivalent to the aforementioned may be used that give equivalent drying to remove a substantial amount of the moisture from the strands. The moisture content of the heated strands is usually less than around 0.06 weight percent and constitutes the glass fibers with the moisture-reduced chemical treatment of the present invention.

A plurality of the moisture-reduced chemically treated glass fibers of the present invention by themselves or in a blend with strands of different chemically treated glass fibers are gathered in parallel to form a rope or roving. The strands of a different chemically treated glass fibers are those commercially available from PPG Industries, Inc. under the trade designation 521 which are disclosed and claimed in U.S. Pat. No. 4,338,234 and particularly at Table 1, the disclosure of said patent is hereby incorporated by reference. The blend of the chemically treated glass fibers can be in any ratio from 1 to 99 to 99 to 1 but preferably is between about 25 percent to around 50 percent of the chemically treated glass fibers of the present invention (Type A) and from around 50 to around 75 weight percent of the commercially available 521 chemically treated glass fibers.

The rovings of the type A or blend type can be used in preparing polymeric molding compounds such as sheet molding compounds, bulk molding compounds and thick molding compounds. For instance, the preparation of sheet molding compounds and bulk molding compounds can be as described in U.S. Pat. No. 4,029,623 hereby incorporated by reference.

The most preferred embodiment of the present invention is demonstrated by the following examples.

EXAMPLE 1

A total of 7 batches of an aqueous chemical treating composition were mixed in accordance with the formulation of Table 1 below.

TABLE 1

| Component | 1101 Size Wt. % of Solids |
|---|---|
| Polyoxy WSR-301 | 0.31 |
| A-174 | 2.4 |
| A-1100 | 1.0 |
| Resyn 1037 | 81.9 |
| Cirrasol 185A | 1.5 |
| Resimene 841 | 6.8 |
| Ammonium Chloride | 3.0 |
| Paraffin/Surfactant | 2.9 |

The aqueous chemical treating composition was diluted to an average of 14.2% solids for application to glass fibers to result in a loss on ignition of about 2.6 percent. Glass fibers with a filament diameter of the K type were sized with the aqueous chemical treating composition to yield chemically treated glass fibers having a moisture content of around 5.7%. These glass fibers formed into K-37 strand and were dried to produce moisture contents of around 0.00 to 0.05 having an LOI in the range of about 2.34 to 2.69. The moisture reduced chemically treated glass fibers in roving package form had a color ranging from 11.6 to 16.0 (YI) yellowing index on a Hunter colorimeter and an acetone solubility in the range of about 17.4 to 21.5. Other samples were prepared in the same manner and had LOIs exceeding 3.3 percent. It was found that the higher LOIs generated high fuzz level to prevent any further fabrication and it was discovered the high LOIs resulted in a greater degree of fiber prominence in reinforced polymeric molded articles. Low LOI values produced inferior products possibly due to secondary wet-out in the polymeric resin.

The chemically treated glass fiber strands were gathered in parallel to produce a roving which was used in evaluation tests to produce sheet molding compound and molded articles therefrom. The resin system was the standard Ashland Phase Alpha with a paste formulation. The treated glass fiber strands from the roving were white in color, chopped cleanly with no static, and formed a very dense sheet on the resin. The results of the production of the sheet molding compound are given in Table 2.

TABLE 2

| Sample Identification[1] | Color | Break up | Static | Chopper Cling | Split % | Glass % | Wet-through | Wet-Out | 16 oz. Sheet Loft (in) | Tensile Strength $10^3$ psi | Flex Strength $10^3$ psi | Flex Modulus $10^3$ psi | Izod Impact Ft-lb/in ASTM D-256 |
|---|---|---|---|---|---|---|---|---|---|---|---|---|---|
| (A) Example 1 K-37 | off-white | 100 | Low | Low | 41.9 | 26.2 | 30 | 95 | 0.125 | 7.21 | 16.8 | 1.14 | 11.6 |
| (B) 521 | Lt tan | 100 | Low | Low | 33.3 | 26.8 | 95 | 100 | 0.240 | 7.83 | 18.5 | 1.30 | 10.4 |
| (C) Example 1 | off-white | 100 | Low | Low | 28.8 | 28.4 | 40 | 95+ | 0.120 | 8.53 | 20.0 | 1.22 | 11.7 |

TABLE 2-continued

| Sample Identification[1] | Color | Break up | Static | Chopper Cling | Split % | Glass % | Wet-through | Wet-Out | 16 oz. Sheet Loft (in) | Tensile Strength 10³ psi | Flex Strength 10³ psi | Flex Modulus 10³ psi | Izod Impact Ft-lb/in ASTM D-256 |
|---|---|---|---|---|---|---|---|---|---|---|---|---|---|
| (D) Example 1 | off-white | 100 | Low | Low | 27.2 | 29.7 | 40 | 100 | 0.120 | 8.20 | 19.8 | 1.22 | 12.7 |
| (E) Example 1 | white | 100 | Low | Low | 39.4 | 27.9 | 30 | 100 | 0.130 | 9.05 | 20.3 | 1.17 | 10.5 |
| (F) Commercial Sample P980A | off-white | 100 | Low | Low | — | 28.1 | 95 | 95+ | 0.127 | 8.09 | 20.8 | 1.24 | 11.4 |
| (G) Example 1 | off-white | 100 | High | High | 0 | 27.9 | 75 | 100 | 0.120 | 8.61 | 21.9 | 1.22 | 13.9 |
| (H) 521 Goodyear Pigmentable Resin Formulation | Lt tan | 100 | Low | Low | 33.3 | 27.3 | 95 | 100 | 0.240 | 7.81 | 21.8 | 1.24 | 11.5 |
| (I) Example 1 | off-white | 100 | Low | Low | 22 | 54.3 | 50 | 100 | 1.140 (mils) | 22.4 | 41.3 | 1.95 | 16.4 |
| (J) Commercial 243 | white | 100 | Low | Low | 59 | 51.4 | 30 | 100 | 0.135 (mils) | 23.1 | 42.4 | 1.84 | 14.7 |

[1] In the Aropol 50405 resin system.

EXAMPLE 2

Chemically treated glass fibers were produced in a manner similar to that of Example 1, but rovings were made by combining various amounts of this chemically treated glass fiber with the 521 chemically treated glass fiber. These rovings were used in producing sheet molding compounds, the evaluations and results are presented in Table 3.

TABLE 3

| Sample/Color Identification | Break Up | Static | Chopper Cling | Split %/% Glass | Wet-Through | Wet-Out | 16 oz. Sheet Loft | Tensile Strength | Flexural Strength |
|---|---|---|---|---|---|---|---|---|---|
| A[1] Example 1/ very lt tan 2K37 2.6 LOI | 100 | LOW/+2 v | LOW | 51.5/— | 60/40 | 95/80 | .120″ | 9.95 | 20.9 |
| B[1] Example 1/ off-white 521 (25%) 2K37 ea. product (1) | 100 | LOW/+8 v | LOW | 59.6/28.8 | 85/60 | 95/90 | .120″ | 8.86 8.04 | 20.4 20.8 |
| C[1] Example 1/ off-white 521 (50%) 2K37 ea. product (1) | 100 | LOW/−8 v | LOW | 58.6/28.5 | 80/60 | 100/85 | .120″ | 9.32 7.37 | 21.4 18.3 |
| D[1] Example 1/ very lt tan 521 (75%) 2K37 ea. product (2) | 100 | LOW/+12 v | LOW | 57.6/29.5 | 90/90 | 100/85 | .153″ | 9.63 8.15 | 19.9 18.1 |
| E[1] Example 1/ lt tan (1) 521 K37 Standard | 100 | LOW/−15 v | LOW | 33.3/28.3 | 95/90 | 100/95 | .240″ | 8.15 | 18 |

(1) Aropol high filled resin systems to product SMC
(2) Aropol 50405 resin system to product SMC.

We claim:

1. Chemically treated glass fibers having on a substantial portion of their surfaces a moisture-reduced residue of an aqueous chemical treating composition consisting essentially of:
   a. vinyl acetate-organo silane copolymer having up to about 1 weight percent of organo silane for the copolymer where the copolymer is pre-crosslinked and where the copolymer is the sole film forming polymer and where the copolymer is present in an effective sole film forming polymeric amount to provide a pre-cured polymeric film forming material for the glass fibers,
   b. methacryloxy alkyltrialkoxy silane coupling agent present in an effective coupling agent amount,
   c. amino organo silane coupling agent present in an effective coupling agent amount,
   d. cationic lubricant present in an effective lubricating amount,
   e. polyoxyethylene present in an amount in the range of about 0.05 to about 0.4,
   f. antistatic agent present in an effective antistat amount,
   g. a wax selected from the group consisting of aqueous wax dispersions and aqueous wax emulsions present in an effective dry lubricating amount,
   h. water present in an effective amount to give a total solids content for the aqueous chemical treating composition ranging from 1 to about 30 weight percent, where the chemically treated glass fibers have an amount of the moisture-reduced residue in the range of 2.2 to 3 weight percent of the glass fibers.

2. Glass fibers of claim 1, wherein the cationic lubricant is pelargonic acid amide of tetraethylene pentamine having a pH at 25° C. for 2% solution of 8.5 to 9.5 and a total acidity of 12 to 14 percent present in an amount from 0.05 to 5 weight percent of the aqueous chemical treating composition.

3. Chemically treated glass fibers of claim 1, wherein the antistatic agent is ammonium chloride.

4. Chemically treated glass fibers of claim 1, wherein the wax emulsion is paraffin wax emulsified in water with nonionic ethoxylated nonyl phenol which is an emulsion at room temperature.

5. Chemically treated glass fibers of claim 1, including an aldehyde condensate in the aqueous chemical treating composition in an amount in the range of up to 5 weight percent of the total solids.

6. Chemically treated glass fibers of claim 5, wherein the aldehyde condensate is melamine formaldehyde.

7. Chemically treated glass fibers of claim 1, wherein the polyoxyethylene polymer has a molecular weight of 4 million or more.

8. Glass fibers of claim 1, wherein the amount of organo functional silane present in the copolymer is around 0.25 weight percent of the copolymer to achieve limited solubility.

9. Chemically treated glass fibers of claim 1, wherein the copolymer is present in an aqueous emulsion.

10. Chemically treated glass fibers of claim 1, present as reinforcement in thermosetting matrix polymer.

11. Chemically treated glass fibers having on a substantial portion of their surfaces a moisture-reduced residue of an aqueous chemical treating composition, consisting essentially of:
   a. vinyl acetate-organo silane copolymer having up to about 1 weight percent organo silane for the copolymer where the copolymer is pre-crosslinked and where the copolymer is present as a sole film forming polymer in the aqueous chemical treating composition in an amount from about 75 to about 95 weight percent of the total solids to provide a precured polymeric film forming polymer for the glass fibers,
   b. gamma methacryloxypropyltrimethoxy silane in an amount from about 2 to about 4 weight percent of the total solids,
   c. gamma aminopropyltrimethoxy silane present in an amount in the range of at least 0.5 weight percent of the total solids but always less than the amount of gamma methacryloxypropyltrimethoxy silane,
   d. pelargonic acid amide of tetraethylene pentamine having a pH at 25° C. for a 2 percent solution of 8.5 to 9.5 and a total acidity of 12 to 14 percent present in an amount from 0.5 to 5 weight percent of the total solids of the aqueous chemical treating composition,
   e. ammonium chloride present in an amount of 0.5 to 5 weight percent of the total solids,
   f. aqueous paraffin wax emulsion with a nonionic methoxylated nonyl phenol surfactant present in an amount of about 0.5 to 4 weight percent of the total solids,
   g. melamine formaldehyde present in an amount of 0 to about 5 weight percent of the total solids,
   h. polyoxyethylene polymer having a molecular weight of 4 million or greater present in an amount of about 0.05 to about 0.4 weight percent of the total solids, and
   i. water present in an effective amount to give a total solids for the aqueous chemical treating composition ranging from 1 to 30 weight percent, where the chemically treated glass fibers have an amount of the moisture-reduced residue in the range of 2.2 to 3 weight percent of the glass fibers.

12. Chemically treated glass fibers of claim 11, wherein the copolymer is present in an aqueous emulsion.

13. Chemically treated glass fibers of claim 11, present as reinforcement in thermosetting matrix polymer.

* * * * *